(No Model.)
J. W. MAXWELL.
BAND SAW MILL.
No. 339,797. Patented Apr. 13, 1886.
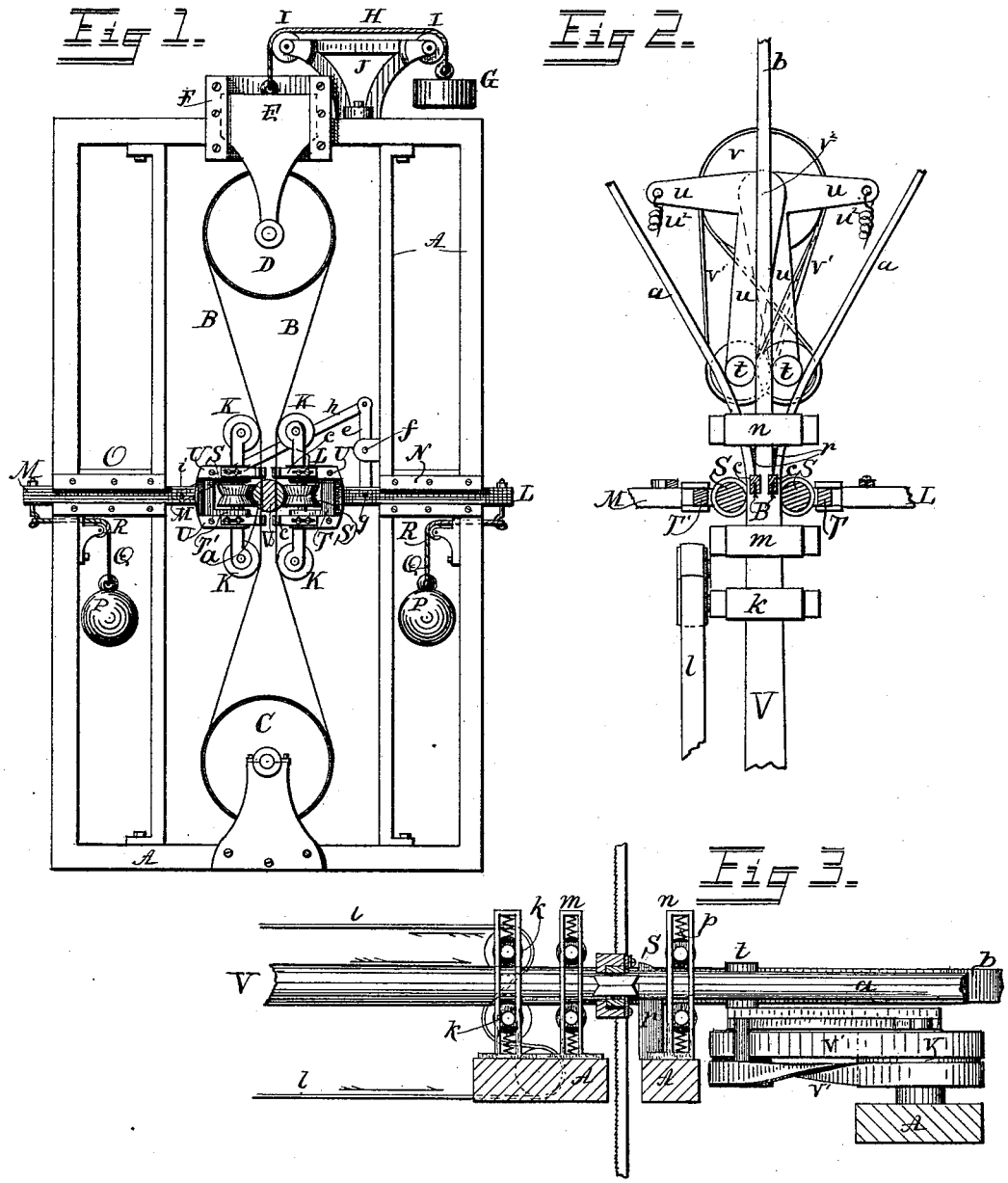
WITNESSES
S. E. E. Stevens.
P. E. Stevens.
INVENTOR
Joseph Wiley Maxwell.
Per W. X. Stevens.
Attorney

UNITED STATES PATENT OFFICE.

JOSEPH WILEY MAXWELL, OF LOUISVILLE, KENTUCKY.

BAND-SAW MILL.

SPECIFICATION forming part of Letters Patent No. 339,797, dated April 13, 1886.

Application filed November 9, 1885. Serial No. 182,182. (No model.)

*To all whom it may concern:*

Be it known that I, JOSEPH WILEY MAXWELL, a citizen of the United States, residing at Louisville, in the county of Jefferson and State of Kentucky, have invented certain new and useful Improvements in Band Sawing-Machines; and I do hereby declare the following to be a full, clear, and exact description of the invention, such as will enable others skilled in the art to which it appertains to make and use the same.

This invention relates to band-saw machines; and its object is to saw parallel strips for hoops from two sides of a hoop-pole at one and the same operation.

As the young trees which are selected for hoop-poles grow more or less tapering and sometimes crooked, peculiar guides and other devices are necessary to direct the pole and saw in sawing hoops of a required thickness from two sides of a pole at once, and for making such hoops of equal thickness throughout their length.

To this end my invention consists in certain guides and tension devices for guiding a band-saw mounted on two wheels, one over the other, so that both its descending and ascending vertical sides may cut at the same time, so that the said vertical sides may approach each other or retreat while at work, and still remain parallel along their cutting portion, and so that the said mounting-wheels may automatically approach each other and retreat to preserve the proper tension at all times upon the saw-band.

It further consists in certain adjustable guides, whereby each portion of the saw independent of the other—the ascending and descending portions—may be adjusted to saw hoops of the required thickness, and in means whereby the two portions may be guided to maintain equal distances with each other at all times from a common central line, as hereinafter described and claimed, reference being had to the accompanying drawings, in which—

Figure 1 is a front elevation of my band-saw machine at the vertical plane of the saw. Fig. 2 is a sectional plan view of the central portion of the same at the line *x x*, Fig. 1. Fig. 3 is a side elevation of the feed-works and hoop-pole guides along the path of the pole, some portions being left off for clearness of illustration, and a part of the frame being shown in vertical section.

A represents a portion of the frame of the machine, and B the band-saw, mounted on wheels C D to revolve therewith. C may be the drive-wheel, journaled in bearings rigidly fixed to the frame in any usual manner. The wheel D is journaled in a hanger, E, which is fitted to slide vertically in a gibbed way, F, that is fixed to the frame A.

G is a weight, connected with the hanger E by a cord or chain, H, passing over pulleys I, which are journaled in a bracket, J, of the frame. By this means the pulley D is made automatically adjustable to the variations of the saw-band.

K represents guide-rollers, of which there are four—two mounted in a frame, L, which is fitted to slide horizontally to the right of the saw in a gibbed way, N, of the main frame A, and two mounted in a frame, M, similarly fitted to slide horizontally to the left of the saw in a gibbed way, O, of the main framè, A.

P P are weights hung to the frames L and M by cords or chains Q, which pass over pulleys R, that are journaled on brackets fixed to the main frame A, the weights acting to press the two vertical parts of the saw toward each other.

S represents two grooved rollers, journaled to revolve horizontally in frames T T', which are fitted to slide horizontally in the frames L and M, respectively, and may be rigidly fixed at any point therein by means of binding-screws and the gibs U. The saw revolves tangent to the inner faces of vertical pairs of the pulleys K, and the hoop-pole V is guided to the saw by the grooved rollers S. A slab is sawed from each side of the pole in its passage through the machine, and these slabs *a* are the hoops sought for. The offal *b* may be resawed in the same manner, producing hoops suitable for some purposes, but not as tough as the slab or first cut. When the pole chances to be of a suitable size, four slab-hoops may be cut from it by turning it after the first cut with its flat sides horizontal. While the saw has a natural tendency when under proper tension to travel in a straight line from roller to roller K, vertically tangent thereto, yet I provide a set of two guides, c, made adjustable on the frames L and M laterally to the path of the saw, in order that each may be fixed exactly astride the saw when in its proper path. These guides secure accuracy of work and safety to the saw.

The frames T T' of the rollers S are made adjustable to or from the saw-path, each relatively to its own pair of rollers K, so that a given thickness of hoop may be sawed from each pole, whether the latter be large or small, and the taper of the pole is accommodated by the frames L and M receding as the size of the passing pole increases, thus forming parallel-sided hoops and leaving the central piece or offal of the same taper as the pole originally was. Should one of the frames L or M be bound a little more closely in its ways N or O, respectively, the pole would not be guided by the rollers S in a central line between the wheels C and D, and damage to the saw might result. I have therefore provided an equalizer consisting of a lever, e, pivoted at f to a bracket of the main frame A, and connected at one end by a pivot, g, with the frame L, and connected at the other end by a link, h, with the frame M at the pivot-pin i. By this means if either roller S is pressed against, so as to slide its supporting-frame L, for instance, outward, the lever e will reverse the direction of motion and press the other frame, M, outward, carrying its roller S the same distance from a central vertical plane between the saws.

k represents a pair of feed-rollers, which may be revolved in any usual manner, as, for instance, by the belt l, so traveling around pulleys mounted on the roller-shafts as to revolve both rollers to feed or draw in the hoop-pole V and press it to the saw B. There may be any suitable number of pairs of guide-rollers m n, to keep the pole from being forced upward or downward, these rollers being mounted in bearings provided with springs p to adjust themselves to crooked poles.

r represents a pair of blades fixed to the frame directly behind the saw, to part the sawed hoops a from the offal b.

t represents two rollers, which are journaled in angle-levers u, that are pivoted at u' to the main frame A, and are actuated by suitable means—such as springs $u^2$—to press the rollers t against the vertical sides of the offal b. These rollers t may be revolved in any suitable manner, as by a drive-wheel, v, and belts v', to serve as feed-rollers, the springs $u^2$ permitting the rollers to adjust themselves to the taper and crooks of the pole. The drive-wheel v is journaled on the same shaft, $v^2$, that the angle-levers u are, or concentric therewith, so that the two rollers t may swing relatively to each other, while the belts of both are driven by the same wheel, v, at an even tension and consequently at an even speed. This band-saw might possibly work well if either the ascending or descending portion were maintained in a straight line tangent to the mounting-wheels C and D, and it is evident that other strips of equal thickness throughout, besides hoop-poles, may be sawed from tapering or irregular lumber. It is possible that the same idea may be adapted to sawing fellies for wheels, forming two fellies at each cut after the first. The inner ends of the guides c will strike together when there is no work in place to resist the inward draft of the weights P on the frames L and M, thus preventing the saw from injury from contact of its oppositely-running portions. The bearing of the wheel C might be mounted to slide, but it would not be so mechanical and nothing would be gained thereby.

What I claim as my invention, and desire to secure by Letters Patent, is—

1. The combination of a band-saw, wheels for mounting it, and rollers journaled in adjustable frames, the said rollers to bear against the outer face of the saw, between the mounting-wheels thereof, substantially as shown and described, whereby the two portions of the saw between the mounting-wheels may be brought near together, for the purpose set forth.

2. The combination of a band-saw, wheels for mounting the same, hangers for the said wheels, one or both of the said hangers mounted to slide in fixed bearings, weights or equivalent means for exerting continual tension to part the said hangers, two pairs of rollers placed opposite to each other and outside of the saw-band midway between the mounting-wheels, frames in which the said rollers are journaled fitted to slide laterally to the saw in fixed bearings, and weights or equivalent means for exerting continual pressure upon the said sliding frames to draw them together, substantially as shown and described.

3. The combination of the band-saw B, the wheels C and D, for mounting the same, the frames L and M, fitted to slide laterally to the saw, a pair of rollers, K, journaled in each of the said frames T and T', fitted to slide in the frames L and M, respectively, and rollers S, journaled in the frames T and T', substantially as shown and described.

4. The combination of band-saw, wheels for mounting it, a frame, L, fitted to slide transversely to the saw, another frame, T, fitted to slide in the frame L, means for fixing the same thereto, a roller, S, journaled in the frame T, two saw-guides adjustably fixed to the frame T or L, and rollers K, journaled in the frame L, substantially as shown and described.

5. The combination of a band-saw, wheels for mounting the same, laterally self-adjusting side guides for the saw, and an equalizer connecting the two side guides, substantially as shown and described, whereby the two guides are impelled to approach or recede from a central plane equally relatively to each other, as set forth.

6. The combination, with a band-saw and the described guides adapted to cut two hoops at once from a hoop-pole, of the parting-blades $r$, two feed-rollers, $t$, two angle-levers, $u$, each carrying one of the rollers $t$ on one of its arms and provided with a spring on its other arm, the two levers mounted on one axis or shaft, $v^2$, a drive-pulley, $v$, journaled on the same axis or concentric therewith, a belt-pulley on the shaft of each roller $t$, and belts connecting the said roller-pulleys with the pulley $v$, substantially as shown and described.

In testimony whereof I affix my signature in presence of two witnesses.

JOSEPH WILEY MAXWELL.

Witnesses:
  FINLAY F. BUSH,
  C. B. SEYMOUR.